March 10, 1959 R. C. BOGERT ET AL 2,876,621
VARIABLE AREA JET ENGINE INLET DUCT
Filed Jan. 4, 1954 2 Sheets-Sheet 1
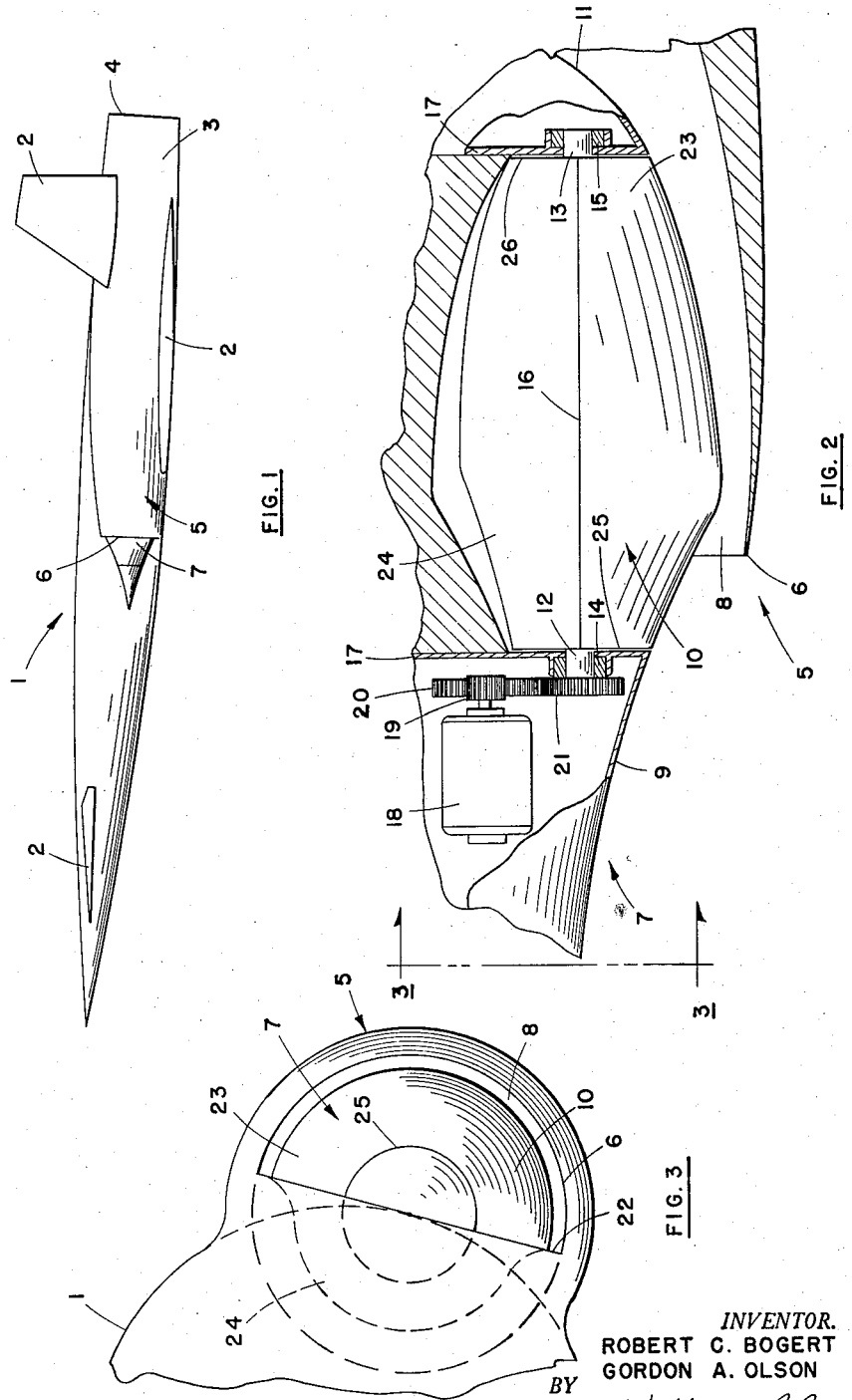
INVENTOR.
ROBERT C. BOGERT
GORDON A. OLSON
BY
ATTORNEY

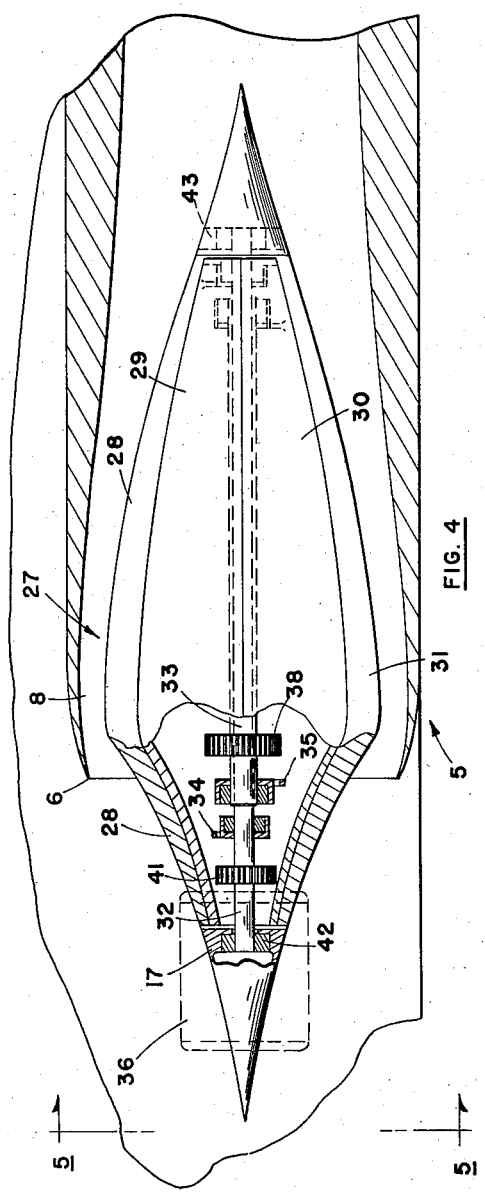
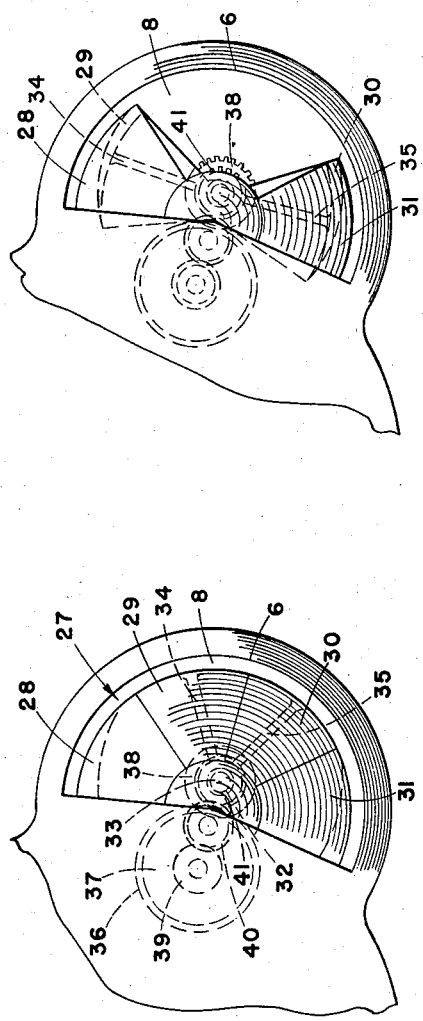

United States Patent Office 2,876,621
Patented Mar. 10, 1959

2,876,621

VARIABLE AREA JET ENGINE INLET DUCT

Robert C. Bogert, Arcadia, and Gordon A. Olson, Anaheim, Calif., assignors to North American Aviation, Inc.

Application January 4, 1954, Serial No. 401,749

6 Claims. (Cl. 60—35.6)

This invention relates to jet engines and more particularly to a variable area jet engine orifice.

Jet engines are conventionally provided with an intake orifice and an exhaust nozzle having a restricted orifice commonly known as the throat. Conventionally both of these orifices are of fixed cross-sectional area and jet engines so constructed can be designed to operate efficiently only within a limited thrust range.

As range, flight Mach number, altitude and need to vary these parameters increases in jet engines, the need for variable geometry for said orifices becomes apparent. Up to this time, designers have been forced to be satisfied with fixed geometry engines because of the mechanical difficulties inherent in any three-dimensional variable system operating at high temperatures and pressures. Today's jets sacrifice optimum design at certain flight Mach numbers in order to operate through a range of Mach numbers.

If jets are to be perfected to operate efficiently over any considerable range of flight parameters, it is necessary that they be designed with variable inlets and exhaust nozzles. Also, since a small variance in the size of an inlet or exhaust nozzle from design values may make a great difference in flight characteristics, it is important that a jet engine have variable geometry so that ground adjustments may be made to yield the optimum flight characteristics.

It has been found, therefore, that varying the inlet orifice and exhaust nozzle areas produces a more flexible control of the airflow so that it may be adjusted to variable flight conditions. A jet engine having these orifices variable, then, claims the advantages of increased thrust range, increased upper altitude limit of operation, and more efficient variable Mach number flight.

This invention contemplates the use of a variable area jet engine inlet particularly adaptable to an Oswatitsch or Ferri type diffuser.

It is therefore an object of this invention to provide a variable area inlet for a jet engine.

It is another object of this invention to provide a device for varying the cross-sectional area of a jet engine orifice.

It is yet another object of this invention to provide means that are simply and ruggedly constructed for varying the area of a jet engine.

It is still another object of this invention to provide means that are simply operated for varying the area of a jet engine inlet.

A further object of this invention is to provide means capable of operating at high temperatures and pressures for varying the area of a jet engine inlet.

Other objects of invention will become apparent from the following description taken in connection with the accompanying drawings, in which Fig. 1 is an elevational view of a missile having a jet engine inlet constructed in accordance with this invention;

Fig. 2 is an enlarged plan view of the inlet portion of the missile of Fig. 1 partially broken away to show the details of one embodiment of this invention;

Fig. 3 is the sectional view taken along the line 3—3 of Fig. 2;

Fig. 4 is an enlarged elevational view of the inlet portion of the missile of Fig. 1 partially broken away to show the details of another embodiment of this invention;

Fig. 5 is a sectional view taken along line 5—5 of Fig. 4;

And Fig. 6 is a sectional view similar to Fig. 5 but showing the inlet area increased.

In detail, Fig. 1 shows a missile or other jet-propelled craft generally designated 1 and having extending lift and control surfaces 2. Missile 1 is adapted to be powered by conventional jet engines, which may be housed in a convenient location such as the rear portion 3, exhausting at 4. Semi-circular inlets 5 are provided on either side of missile 1, forward of the engines, for capturing and conducting air from the atmosphere to the engines.

Inlets 5 are each composed of a sharp-edged (for supersonic operation) lip member 6 and have halfconical inner body 7 mounted internally thereof. Such inlets are commonly known as Oswatitsch or Ferri type diffusers or spike diffusers. The placement of body 7 with relation to lip 6 and the inlet duct for 22 creates a semi-annular channel or orifice 8 (Fig. 2) through which air is adapted to pass as previously described. It is for the purpose of varying the area of this channel or orifice that the present invention is presented.

From Fig. 2 it will be seen that inner body 7 is composed of three sections, a pointed-conical forward section 9, a substantially drum-shaped, convex, central section 10 and an aft section 11 similar to section 9. Mounting shafts 12, 13 are journaled in bearings 14, 15, respectively, and secured to central section 10 so as to support said central section for rotation about its longitudinal axis 16. Bearings 14, 15 are suitably supported by any convenient frame member 17 and shafts 12, 13 and central section 10 can be rotated by motor 18 driving through gears 19, 20, and 21.

Central section 10 of inner body 7 will be seen, in Fig. 3, to be composed of two half-portions of substantially differing diameters. Large-diameter portion 23 is shown extending into channel 8 while small-diameter portion 24 is shown to be recessed within the body of missile 1.

In operation, if it is necessary to provide for greater airflow through channel 8 (as when missile 1 must operate at a flight speed less than that for which it was designed) central section 10 need only be rotated about axis 16 180° in order to reverse the positions of portions 23, 24 from that shown in the drawings thereby increasing the cross-sectional area of channel 8. It will be seen that ends 25 and 26 of section 10 are circular so as to be faired into portions 9 and 11 no matter what the position of central portion 10.

In the embodiment shown in Fig. 4 the shell of hollow inner body 27 is cut into melon-shaped, adjoining, segments or strips 28, 29, 30, 31. Segments 28 and 31 are fixed in place to the body of missile 1 while segments 29 and 30 are secured to contra-rotating shafts 32, 33 as by flanges 34, 35, respectively. As seen in Fig. 6, segments 29 and 30 rotate about the axis of shafts 32, 33 such that they may be telescoped within segments 28, 31, respectively. Shafts 32, 33 and thereby segments 29, 30 may be rotated by any convenient driving means such as a motor 36 shown to be gear-connected to said shafts. In order that segments 29 and 30 rotate in opposite directions it is necessary that shaft 33 be driven by gear 37 and pinion 38 whereas shaft 32 is driven by gear 39, idler gear 40, and pinion 41. Shafts 32, 33 may be journaled for rotation in suitable bearings 42, 43 mounted on frame 17 of missile 1.

As in the device previously described, when inner body 27 is in the position shown in Figs. 4, 5 it forms an annular channel 8 between said inner body and lip 6 of inlet 5. In order to increase the cross-sectional area of said channel it is necessary only to rotate shaft 32 in a counterclockwise direction and shaft 33 in a clockwise direction (as seen in Figs. 5, 6) so as to telescope segments 29, 30 within fixed segments 28, 31, respectively. This adds a substantially greater area in the form of the V-shaped notch (Fig. 6) to channel 8 thereby increasing the air intake area for the purpose previously described.

The latter device, described in Figs. 4, 5, and 6 will be seen to be equally applicable to a circular diffuser as well as for the semi-circular diffuser shown.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A variable jet engine inlet comprising a semi-circular lip member, a double-ended conical spike center body mounted with its longitudinal axis coincident with the longitudinal axis of said lip member and within said lip member to form a substantially semi-annular orifice between said lip member and said body for airflow longitudinally of said orifice, said body having a rotatable center section composed of two common-base, unsymmetrical, substantially truncated cones of substantially differing diameters, and means for rotating said center section, whereby when said section is rotated the area of said orifice varies.

2. A variable area air inlet for a jet engine comprising a D-shaped entrance duct, an opposed conically-ended body mounted longitudinally coaxial with and substantially internally of said duct to form an annular orifice between said body and said duct for airflow longitudinally of said orifice, said body having a center section composed of two common-base, unsymmetrical, substantially truncated cones of substantially differing diameters mounted for rotation about the longitudinal axis of said body, whereby the rotation of said center section causes the area of said orifice to vary.

3. A variable area inlet for a jet engine comprising a semi-circular lip member, a half-conical body rotatably mounted partially internally and longitudinally coaxial of said lip member to form a substantially semi-annular orifice between said lip member and said body for airflow longitudinally thereof, and means for rotating said body substantially out of the path of said airflow to increase the area of said inlet.

4. A variable area inlet for a jet engine comprising a substantially semi-circular lip member, an unsymmetrical body of substantially the shape of a longitudinal, external segment of a prolate spheroid mounted partially internally and longitudinally of said lip member to form a substantially semi-annular orifice between said lip member and said body for airflow longitudinally of said orifice, said body being rotatable about an axis substantially parallel to the axis of said lip member and substantially out of the path of said airflow, and means for rotating said body out of the path of said airflow to increase the area of said inlet.

5. A device for varying the cross-sectional area of a flow channel of an engine duct designed for fluid flow from a forward direction to an aft direction comprising a pointed-end ellipsoidal body extending longitudinally of said channel of the duct, mounted coaxially within said channel of the duct, and having a longitudinally extending unsymmetrical center section rotatably mounted in said body on an axis substantially coaxial with the longitudinal axis of said duct and extending through one side of said body into said duct, said center section having surface sections of substantially different transverse radii of curvature, said surface sections being substantially concentric to the inner wall of said duct in any transverse plane, means for rotating said center section about its axis to move said surface sections into and out of the path of said fluid flow for restricting and expanding the cross-sectional area of said channel.

6. A variable area air inlet for a jet engine comprising a curved air-collecting cowl conducting airflow longitudinally inwardly therethrough, a sharp ended, prolate spheroidal body extending longitudinally of said cowl, mounted with its axis substantially coaxial with the longitudinal axis of said cowl, extending partially outwardly of said cowl, a center section rotatably mounted in said body with its axis of rotation substantially coaxial with the axis of said body, said center section extending through one side of said body, said center section having longitudinally extending surface sections of substantially differing radii of curvature and of substantially differing cross-sectional areas in individual transverse planes, the outer surface of each of said surface sections being substantially concentric to the inner surface of said cowl in individual transverse planes, said different surface sections being substantially concentric, in individual transverse planes, to the same longitudinal axis which is the axis of rotation of said center section, means to rotate said center section so as to move said different surface sections into and out of the path of said airflow so as to vary the intake area of said inlet.

References Cited in the file of this patent

UNITED STATES PATENTS

| | | |
|---|---|---|
| 2,579,043 | Kallal | Dec. 18, 1951 |
| 2,632,295 | Price | Mar. 24, 1953 |
| 2,638,738 | Salter | May 19, 1953 |
| 2,669,834 | Helms | Feb. 23, 1954 |